March 26, 1963 E. G. RICE Re. 25,360

COMBINATION STOCKINGS AND PANTY

Original Filed Nov. 9, 1956

INVENTOR.
ERNEST G. RICE.
BY David Rabin
ATTORNEY

United States Patent Office

Re. 25,360
Reissued Mar. 26, 1963

25,360
COMBINATION STOCKINGS AND PANTY

Ernest G. Rice, High Point, N.C., assignor to Tightpat, Inc., Greensboro, N.C., a corporation of North Carolina Original No. 2,826,760, dated Mar. 18, 1958, Ser. No. 621,464, Nov. 9, 1956. Application for reissue Mar. 13, 1958, Ser. No. 724,220
1 Claim. (Cl. 2—224)

Matter enclosed in heavy brackets [ ] appears in the original patent but forms no part of this reissue specification; matter printed in italics indicates the additions made by reissue.

The present invention relates to ladies' knitted articles and more particularly to a combination garment in which a pair of stockings and underpants are unitarily formed.

Separate garter belts or hosiery supporter attachments to ladies' foundation garments are necessary in order to provide a fastening means for the welt of a stocking to retain a stocking in a taut condition while on the wearer's leg. Frequently snags or runs are produced in the stockings by improper garter fastening means or by occasional adjustment to the stockings.

It is an object of this invention to provide a unitary garment which includes a pair of stockings and a pair of underpants that eliminates the need for garter attachments and belts.

Another object of this invention is the provision of a combination garment which includes a pair of ladies' seamless stockings and a panty formed together with the stockings.

Yet another object of the present invention is the provision of a unitary knitted panty-stocking garment in which the panty portion may be separated from the stockings when the stockings are to be discarded.

Still a further object of this invention is the provision of an economical combination garment which garment includes a pair of seamless stockings and a panty girdle.

The present invention contemplates a combination garment in which a pair of circular knit seamless stockings, preferably of nylon, having foot, leg and individual welt portions is integrally combined with an upper enlarged tubular or welt section that is knit as a continuation of the stocking welts to form a pair of underpants having a crotch portion therebetween.

Other and further objects and many of the attendant advantages of this novel garment combination will become more readily apparent as the invention becomes better understood from the following detailed description taken in conjunction with the accompanying drawings in which like characters of reference designate corresponding parts throughout the several views, and wherein.

Figure 5:
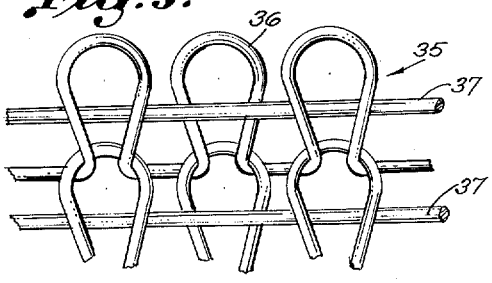
Figure 6:
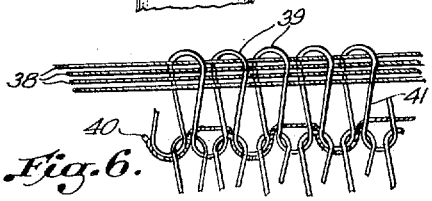

FIG. 5 is a greatly enlarged view of a knitted fabric for the upper portion of the garment having elastic yarn laid into the knitted fabric without interknitting with the loop stitches; and FIG. 6 is a greatly enlarged view of a modified knitted fabric for the upper portion of the garment in which the top loops have a plurality of elastic yarns laid in a course of stitches without interknitting and a course having a single elastic yarn interlaced with the loop stitches.

Referring to the drawing and more particularly to FIG.

1 there is illustrated a combination garment 10 in which individual ladies' stockings 11 and 12 are provided with the upper portions of the stockings united so as to form a pair of underpants 13. The invention will be described specifically with reference to a preferred embodiment, however, it is to be understood that it is not intended in any limitative sense. The stockings 11 and 12 are conventional seamless sheer stockings, preferably formed of nylon yarn, produced on a standard "400" needle circular knitting machine. Each stocking is constituted by a foot portion 14, preferably having reinforced toe and heel pockets 15, 16, respectively, a leg portion 17, a lower welt portion 18 and an upper elongated welt portion 19. Customarly a 15 denier continuous monofilament nylon yarn is used to form the sheer portion of the stocking and 30 denier yarn is desirable for use in combination with the 15 denier yarn in those regions where reinforcement is desirable including the lower welt portion 18. However, finer or coarser yarn may be employed at various knitted positions in the knitted fabric. Furthermore, it is also contemplated that stretch nylon yarn may also be employed to knit each of the stockings throughout.

The upper elongated welt portion 19 is preferably knit on the same circular knitting machine as the leg of the stocking with a plied multifilament yarn, such as 70 or 100 denier. Yarn in the elongated welt portion 19 may be of stretch nylon type, if desirable, or of one of a combination knitted constructions as will be described hereinafter. In the fabrication of the tubular knitted farbic, the welt is formed in the usual manner as is the remainder of the stocking with the exception that the upper welt portion is considerably longer than a conventional welt.

Upon completion of the tubular fabric constituting a single stocking, a transverse seam or line of sewing stitches 21 is sewn in the stocking on the inside portion of the leg with the stitches being in spaced relation to the welt 22. By making the stitches in the sewn line 21 sufficiently small to catch the knitted loops a run and ravel in the fabric may be eliminated at the juncture between the flaps. A longitudinal cut 23 is then made in the welt of the fabric which cut extends just short of the transverse stitches 21 thereby dividing the top welt portion of a right leg stocking 11 into a front and a rear flap 24 and 25, respectively, and the top welt portion of a left leg stocking 12 is divided in front and rear flaps 26 and 27, respectively.

A pair of stockings, one right and one left leg, in which the elongated welts are slit may be placed together in the correct oriented position with the front flaps 24 and 26 and the rear flaps 25 and 27 of the stockings placed together and the exposed flap sides sewn together by a continuous seam 28. The seam 28 forms a U-shaped configuration in end view, as more clearly illustrated in FIG. 2, for securing the two stocking welts together along the cut portions to form a single enlarged welt at the top of the stockings that resembles a pair of underpants or a panty. As will be apparent, the perimeter of the single welt for pantry portion will be equal substantially to twice the perimeter of the tubular welt portion at the corresponding position of measurement.

The medial portion 29 of the seam 29 formulates a crotch area of the panty above the welt line 20. Obviously, a reinforced panel may be sewn to the crotch area, if necessary. Thus each elongated welt 19 provides a half panel for the panty portion of the garment which panel reaches from the front center portion of the front of the garment of the center portion at the rear of the garment. A woven elastic tape 30 is sewed adjacent to the top edge 31 of the panty portion to provide the requisite elasticity for the top of the garment.

Figure 1:
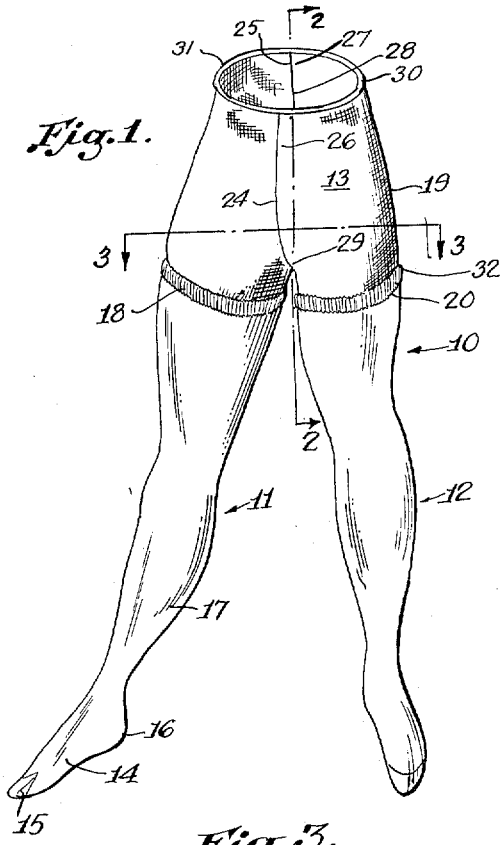
FIG. 1 is a front perspective view of one embodiment of the combination stocking-panty garment of the present invention.
Figure 2:
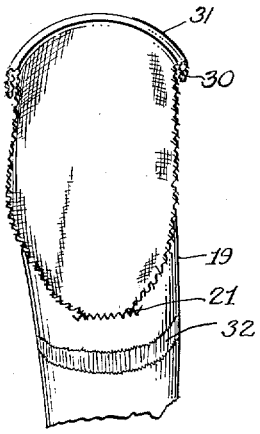
FIG. 2 is a partial transverse sectional view taken substantially along the plane of section line 2—2 of FIG. 1.
Figure 3:
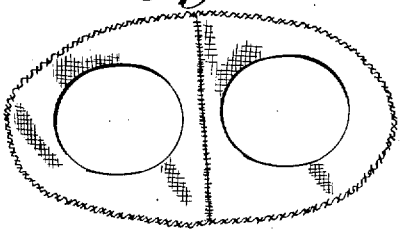
FIG. 3 is a transverse sectional view taken substantially along the plane of section line 3—3 of FIG. 1.
Figure 4:
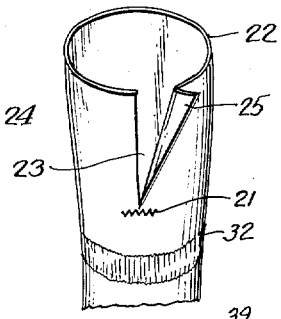
FIG. 4 illustrates the top portion of a single stocking with an elongated welt having a partial longitudinal slit therein.

It has been found desirable to provide a circumferential seam 32 for each of the stockings 11 and 12 sufficiently below the terminal point of the longitudinal slit 23, as shown in FIGS. 1, 2 and 3. When the garment is provided with the seams 32 the stockings, when no longer serviceable, may be separated, as by cutting below the seam 32, from the panty portion of the garment and discarded. The seam 32 will reduce the possibility of runs occurring from the selvedge remaining below the seam.

Although stretch nylon yarn from 70 to 100 denier has been employed in the elongated welt portions of the stockings, and found to be satisfactory, inelastic yarns may be employed with very satisfactory results. It is also contemplated that with an inelastic yarn being fed to the needles in the usual manner, added elasticity may be provided in the upper welt fabric by either knitting or laying in without interknitting a highly elastic yarn into the fabric at selected courses or in all the courses of the welt knitted fabric.

As illustrated in FIG. 5, the knitted fabric 35 for the upper welt may be formed in the usual manner with an inelastic yarn forming the loops 36 with an interlaid highly elastic strand 37 placed in each course, alternating in front of one wale and to the rear of the next wale. Obviously, the number of wales and the sequence for the elastic yarn distribution may be varied as well as the number of strands which are to be interlaid in each course. It may be desirable to include several courses of the fabric illustrated in FIG. 5 intermediate the length of each stocking above the knee to provide an added means for supporting each stocking.

A modified treatment of the highly elastic fabric is illustrated in FIG. 6 in which a plurality of highly elastic yarns 38, under suitable tension, are laid in the initial course of the selvedge edge loops 39 and retained therein without interknitting with the loops as performed in a recognized manner. The elastic yarn 40 in the tubular fabric is laid in under tension without interknitting with the loops 41 by interlacing engagement with the loop stitches in alternate needle wales and passed behind the loops in the intermediate needle wales. The extent of insertion of the highly elastic yarn may vary from several courses at the band or top of the garment to a full highly elastic fabric in the upper welt portion. Obviously, other knitted structures are contemplated in whigh highly elastic yarns or strands may be employed in this combination garment to form a highly elastic band member as well as a highly elastic panty.

It will be appreciated that upon making the longitudinal cut in the welt of each stocking there may be a tendency for the interlaid highly elastic yarn to pull out, however, adequate relaxation of the elastic strands and frictional engagement with the knitted loop structure prevents the cut ends from contracting. Upon sewing the flaps together the cut elastic strand ends are gathered within the seam and will not pull out.

Obviously many modifications and variations may be made in the construction and arrangement of the upper welt portions of the stockings to form the underpants of the combination garment as well as a transfer operation of the pair of stockings to obtain a variation of the fabric for the upper portion in the light of the above teachings without departing from the real spirit and purpose of this invention. It is, therefore, to be understood that within the scope of the appended claim many modified forms of knitted structure may be reasonably included and modifications are contemplated.

What is claimed is:

A combination panty and stocking formed from circularly knit fabric comprising a pair of stockings of seamless knit construction having foot, leg and welt portions, said welt portions being knit of stretchable yarn and adapted to extend above the knee to the waist of the wearer, said welts each having a longitudinal [seam] *slit* intermediate the front and rear of the stocking, said first and second stockings being oriented to position the longitudinal [seams] *slits* adjacent each other, and a seam binding the corresponding front and rear edges formed by the longitudinal slits to form a U-shaped seam intermediate a single enlarged welt and defining the panty.

References Cited in the file of this patent or the original patent

UNITED STATES PATENTS

| | | |
|---|---|---|
| 256,532 | Appleton | Apr. 18, 1882 |
| 364,650 | Holmes | June 14, 1887 |
| 402,202 | Sutton | Apr. 30, 1889 |
| 464,118 | Granz | Dec. 1, 1891 |
| 732,603 | Taylor | June 30, 1903 |
| 2,396,166 | Faucette | Mar. 5, 1946 |
| 2,493,357 | Miller | Jan. 3, 1950 |
| 2,697,925 | Goodman | Dec. 28, 1954 |

FOREIGN PATENTS

| | | |
|---|---|---|
| 18,624 | Great Britain | of 1893 |
| 5,136 | Great Britain | of 1894 |
| 15,835 | Great Britain | of 1894 |